| United States Patent [19] | [11] Patent Number: 4,530,976 |
| Kordomenos et al. | [45] Date of Patent: Jul. 23, 1985 |

[54] FLEXIBLE UNI-BASECOAT/TWO COMPONENT CLEARCOAT COATING COMPOSITIONS

[75] Inventors: Panagiotis I. Kordomenos, Mt. Clemens; Kenneth R. Kurple, Anchorville; Delores J. Alexander, Southfield, all of Mich.

[73] Assignee: Ford Motor Company, Dearborn, Mich.

[21] Appl. No.: 598,551

[22] PCT Filed: Oct. 13, 1983

[86] PCT No.: PCT/US83/01604

§ 371 Date: Oct. 13, 1983

§ 102(e) Date: Oct. 13, 1983

[87] PCT Pub. No.: WO85/01737

PCT Pub. Date: Apr. 25, 1985

[51] Int. Cl.³ .............................................. C08L 75/06
[52] U.S. Cl. .................................. 525/440; 428/423.1; 428/423.7; 428/425.8; 525/443; 525/456; 525/457
[58] Field of Search ............... 525/440, 443, 454, 456, 525/457; 528/60, 85; 427/409, 412.5; 428/423.7, 425.8, 423.1

[56] References Cited

U.S. PATENT DOCUMENTS

| 3,763,079 | 10/1973 | Fryd | 260/37 N |
| 3,882,189 | 5/1975 | Hudak | 260/850 |
| 3,954,899 | 4/1976 | Chang et al. | 260/849 |
| 3,962,522 | 6/1976 | Chang et al. | 428/423 |
| 4,017,456 | 4/1977 | Tucker et al. | 260/45.8 R |
| 4,021,505 | 5/1977 | Wang | 525/443 |
| 4,034,017 | 7/1977 | Chang et al. | 260/859 R |
| 4,205,115 | 5/1980 | Piccirilli et al. | 428/334 |
| 4,208,495 | 6/1980 | Chang et al. | 525/440 |

*Primary Examiner*—Theodore E. Pertilla
*Attorney, Agent, or Firm*—Lorraine S. Melotik; Roger L. May

[57] ABSTRACT

This invention is directed to flexible basecoat/clearcoat coating systems which have excellent adherence to metal and plastic substrates and possess superior weathering properties. The clearcoat and basecoat composition comprises hydroxy-containing urethane modified polyester, made by reacting a urethane modified diol with polyol and diacid component, and crosslinking agent. The crosslinking agent of the pigmented basecoat composition comprises amine-aldehyde crosslinking agent. The crosslinking agent of the clearcoat comprises polyisocyanate crosslinking agent. Optionally, either or both compositions may comprise a high molecular weight linear polyurethane.

20 Claims, No Drawings

FLEXIBLE UNI-BASECOAT/TWO COMPONENT CLEARCOAT COATING COMPOSITIONS

Reference is made to concurrently filed and commonly assigned related U.S. applications Ser. No. 553,322 entitled "Flexible Coating Compositions", U.S. application Ser. No. 592,124 entitled "Flexible Basecoat/Clearcoat Coating Compositions", both to Alexander et al; U.S. application Ser. No. 558,399 entitled "Flexible Two Component Urethane Coating Compositions", U.S. application Ser. No. 555,463 entitled "Flexible Basecoat/Two Component Clearcoat Coating Compositions", abandoned in favor of CIP application Ser. No. 615,700 filed May 29, 1984; all to Kordomenos et al. This invention relates to flexible coating systems which have excellent adherence to metal and plastic substrates and posses superior weathering properties. Basecoat/clearcoat systems comprise a finish of a clear topcoat layer in film adherence to a basecoat that is in adherence to a substrate. More particularly, the invention relates to a basecoat/clearcoat coating composition wherein the basecoat and the clearcoat composition each comprise hydroxy-containing urethane modified polyesters, made from urethane modified diols reacted with polyol and diacid component, crosslinking agent and, optionally, a high molecular weight linear polyurethane. The basecoat, which additionally contains pigment, employs amine-aldehyde crosslinking agent while the clearcoat employs polyisocyanate crosslinking agent.

BACKGROUND ART

Recently, there has been interest in the use of rubbery resilient materials for areas which are subject to mechanical shock such as automobile bumpers, moldings and front ends. The use of such materials aids in providing protection from permanent structural damage but, in order to attain the desired appearance, a protective coating must have unique properties, such as a high degree of extensibility, impact resistance, resistance to cracking under severe environmental conditions, such as exposure to low temperature and low humidity. Conventional coatings, including those employed on rubber and similar extensible objects heretofore, do not have the required combination of properties. Generally compositions that are flexible enough to be applied over both metal and plastic substrates have rather poor weatherability and overall durability.

U.S. Pat. No. 3,882,189 and U.S. Pat. No. 3,962,522 are exemplary of numerous patents which describe flexible coating compositions wherein the resin comprises polyurethane modified polyesters formed by reacting polyisocyanate with polyester polyols. These resins are cured with amine aldehyde crosslinkers. It is taught therein, that the presence of the urethane groups in the polymer significantly contributes to the flexibility as well as improved weathering properties, gloss, and abrasion resistance of the coating. However, while it is thus desirable to employ a substantial number of urethane groups in these resins, the amount which may be included in these types of resins is limited. When hydroxy polyester resin is reacted with polyisocyanate it has a tendency to form a gelled mass and thus the amount of polyisocyanate that may be employed must be restricted in order to avoid gelation. Still further, these urethane linkages are added in a latter modification of the polyester polyol reaction product, rather than being incorporated into the backbone of the resin.

DISCLOSURE OF THE INVENTION

This invention is directed to a flexible basecoat/clearcoat coating composition which is suitable for use over various substrates, including rubbery, resilient materials as well as metal. The basecoat/clearcoat coating composition of this invention is characterized in that the basecoat composition and the clearcoat composition each independently comprises:

(A) hydroxy-containing urethane modified polyester (i) having a number average molecular weight ($\overline{M}_n$) of between about 1000 and about 10,000 (ii) having a hydroxyl number of between about 30 and about 200, and (iii) containing between about 1 to about 10 urethane groups per molecule, and being made from reactants comprising:
   (1) urethane modified diol made by reacting: (a) diol, (b) diisocyanate, wherein the diol and diisocyanate are reacted in a molar ratio of from about 4:1 to about 4:3;
   (2) polyol comprising at least about 5 weight percent triol; and
   (3) acid component selected from dicarboxylic acids and anhydrides thereof;
(B) crosslinking agent; and
(C) 0–60 weight percent, based on the total weight of (A) and (B) of the composition, of a linear polyurethane having a number average molecular weight of between about 15,000 and about 40,000, preferably of between about 20,000 and about 30,000. The basecoat composition additionally comprises pigment.

The crosslinking agent of the clearcoat composition of this invention is a polyisocyanate crosslinking agent. The crosslinking agent of the basecoat composition of this invention is an amine-aldehyde crosslinking agent.

Advantageously, the flexible basecoat/clearcoat coating compositions of the invention of this application posses superior weathering properties as well as excellent adhesion to metal and plastic, thus making them well suited for use as coatings on various car components. In forming the hydroxy-containing urethane modified polyester of the clearcoat, the urethane linkages are advantageously incorporated into the backbone of the modified polyester, since they are formed in an initial reaction of diisocyanate with the diol, rather than being incorporated into the polyester in a later reaction step as is done when forming prior art urethane polyester resins. It has now been found that the initial incorporation of the urethane linkage into the backbone of the modified polyester allows the formation of more flexible coatings with improved weathering properties, particularly suitable to form automotive basecoat/clearcoat coatings.

Still further, the ability to use of the same coating compositions on metal and plastic components in car production offers distinct commercial advantages, particularly in terms of production efficiency. Additionally, because this system can be employed on metal as well as plastic components, the problem of color matching, which must be resolved when using a different coating on the metal and plastic, is eliminated.

Best Mode for Carrying Out the Invention

This invention is directed to flexible basecoat/clearcoat coating compositions, wherein the basecoat composition and the clearcoat composition comprise hydroxy-containing urethane modifying polyester and crosslinking agent. The basecoat composition crosslinking agent is amine-aldehyde while the clearcoat composition crosslinking agent is polyisocyanate. The basecoat composition additionally comprise pigment. Optionally, the basecoat composition and/or the clearcoat composition may include a high molecular weight linear polyurethane. The novel hydroxy-containing urethane modified polyester is made from urethane modified diols reacted with polyol and diacid component. The various components of the compositions of this invention will be discussed in detail.

The hydroxy-containing urethane modified polyester of the basecoat/clearcoat coating composition of this invention has a manner average molecular weight ($\overline{M}_n$) of between about 1000 and about 10,000, preferably between about 2000 and about 4000. This modified polyester has a hydroxyl number of between about 30 and about 200, preferably between about 50 and about 120. It also contains between about 1 to about 10 urethane groups per molecule. One of the reactants used to form the hydroxy-containing urethane modified polyester is a urethane modified diol which is made by reacting diol and diisocyanate. In forming this urethane modified diol, the diol and the diisocyanate are reacted in a molar ratio of from about 4:1 to about 4:3, preferably in a molar ratio of from about 2:0.8 to about 2:1.2, most preferably in about a 2:1 molar ratio. The diols employed in making the urethane modified diol include, but are not limited to, alkylene glycols, such as butylene glycol, neopentyl glycol, 1,5,penetane glycol, 3-cyclohexene-1,1-dimethynol, and other glycols such as hydrogenated bisphenol A, caprolactone diol (i.e., the reaction product of caprolactone and ethylene glycol), hydroxy alkylated bisphenols, polyether glycols, e.g., poly(oxytetramethylene) glycol, polyester diols, e.g., 2,2-dimethyl-3-hydroxypropyl-2,2-dimethyl-3-hydroxypropionate, and the like. Preferred diols are neopentyl glycol and 2,2-dimethyl-3-hdyroxypropyl-2,2-dimethyl-3-hydroxypropionate, the latter material being commercially available as Esterdiol 204 (a trademark of and available from Union Carbide, New York, N,Y.). While a number of types of diols have been mentioned above as suitable for use of the diol component in making the urethane modified doil of this invention, their disclosure is not meant to be limiting. A great many diols are known in the art. Selection of other diols which would be suitable for use in forming the urethane modified diol would be well within the skill of those in the art. Mixtures of diols may also be employed to make the urethane modified diol.

The diisocyanate employed in making the urethane modified diol may be essentially any diisocyanate. Many such organic diisocyanate are known in the art. Suitable diisocyanates include hydrocarbon diisocyanate or substituted hydrocarbon diisocyanate, such as 1,6-hexamethylene diisocyanate, isophorone diisocyanante, p-phenylene diisocyanate, biphenyl diisocyanate, toluene diisocyanate, and 3,3-dimethyl-4,4-biphenylene diisocyanate. While the diisocyanate may be any of a number of aliphatic, cycloaliphatic, and aromatic diisocyanates, it is preferred that the diisocyanate be an aliphatic diisocyanate, such as 4,4-dicyclohexylmethenediisocyanate. As would be apparent to those skilled in the art, mixtures of various diisocyanates may also be employed at the diisocyanate component used in forming the urethane-modifying diol.

The polyol component used in forming the hydroxy-containing urethane modified polyester of the basecoat/clearcoat compositions comprise at least about 5 weight percent triol (based on the weight of the polyol component). Preferred triols are conventional low molecular triols such as 1,2,6-hexane triol, 1,1,1-trimethylol propane, pentaerythritol, 3-(2-hydroxypropoxy)-1,2-propanediol and polycaprolactone triols, which are commercially availabe as, for example PCP-301 (trademark, Union Carbide Corp. New York, N.Y.). This polyol component may also comprise, in addition to the triols other polyol materials such as diols of tetrols. Preferably, however, these other polyols, when employed. consist of diols. Examples of suitable diols which may be included in the polyol component are those which have been disclosed above as a component for forming the urethane modified diol. While the polyol component may comprise materials such as a diol in addition to the triol, the polyol component may consist essentially of triols. By employing diols in the polyol component in addition to the triols the flexibility of the coating composition is generally increased. Thus selection of the polyol component to be used in forming the hydroxy-containing urethane modified polyester of the clearcoat will be dependent on the particular desired properties and application of the coating composition. When diols are employed in the polyol component, the polyol preferably comprises from about 10 to about 80 weight percent triols and from about 90 to about 20 weight percent diols.

The acid component which is used to form the modified polyester of the compositions of this invention comprises aliphatic, aromatic, cycloaliphalic dicarboxylic acid or anhydrides. Preferred dicarboxylic acids are the $C_6$–$C_{12}$ acids, which include adipic, azelaic, sebasic, or dodecane dicarboxylic acid, or cyclohexanedicarboxylic acid. More preferably, the dicarboxylic acids employed are aliphatic dicarboxylic acids, most preferably, additionally being linear. Mixtures of suitable acids and/or their anhydrides may also be used as the acid component in this invention.

In forming the coating compositions of this invention, the diol (a) and the diisocyanate (b) described above are combined and reacted, generally at an elevated temperature so as to form the urethane modified diol. The ratio of the diol to diisocyanate (i.e., a molar excess of diol) has been chosen so that at the completion of this reaction no free isocyanates are present, having been incorporated into a hydroxy functional material. This urethane modified diol is then combined and reacted with the polyol and acid components, generally in the presence of a catalyst and at elevated temperatures, so as to effect formation of a hydroxy-containing urethane modified polyester. Suitable catalysts for the carboxy/hydroxy condensation reaction include such catalysts as tetraisopropyl titanate, strong acids such as p-toluene phosphonic acid, phosporic acid sulfuric acid and materials such as zinc oxide, antimony oxide ($S_bO_3$) and sodium acetate. Other catalysts will be apparent to those skilled in the art.

The reactions, whereby the hydroxy-containing urethane modified polyesters of the basecoat or clearcoat are formed, are generally carried out in the presence of solvents commonly employed for coating formulations such as toluene, xylene, methyl amyl ketone, etc.

The hydroxy-containing urethane modified polyester of the basecoat coating composition and the clearcoat coating composition employed in the basecoat/clearcoat system may be similar or different embodiments of this polyester. Selection of the particular modified polyester to be employed in the coatings would be dependent on the particular properties and application of the coatings desired. Such selection will be well within the skill of one in the art.

The crosslinking agent of the clearcoat coating composition of the invention is a polyisocyanate crosslinking agent, i.e., a compound having 2 or more, preferably 3 or more, reactive isocyanate groups per molecule. These polyisocyanate materials function as a crosslinking agent in the composition of the invention by reaction with the hydroxyl functionality of the hydroxy containing urethane modified polyester (A) and by reaction with the hydroxyl functionality on the linear polyurethane if such linear polyurethane is included in the composition. This polyisocyanate crosslinking agent is generally included in the clearcoat coating composition of the invention in an amount of between about 5 and about 60, more preferably between about 20 and about 40 weight percent based on the weight of the hydroxy-containing urethane modified polyester of the clearcoat composition. Selection of the optimal amount of polyisocyanate crosslinking agent to be employed in the coating composition is dependent on the desired properties (e.g., flexibility) as well as its intended use and selection of such amount would be within the skill of one in the art.

Polyisocyanates are well known in the art and numerous suitable organic isocyanates having 2 or more reactive isocyanate groups per molecule will be apparent to those skilled in the art. Among the many suitable polyisocyanates are aliphatic, cycloaliphatic and aromatic isocyanate compounds. Representative of the numerous isocyanates which may be employed are (1) aliphatic diisocyanates such as trimethylene diisocyanate, tetramethylene diisocyanate, pentamethylene diisocyanate, hexamethylene diisocyanate, 1,2-propylene diisocyanate, 1,2 butylene diisocyanate, 2,3 butylene diisocyanate, 1,3 butylene diisocyanate, 1,3 butylene diisocyanate, ethylidene diisocyanate, butylidene diisocyanate, 4,4'bis(isocyanate hexyl) methane, bis(2-isocyanateethyl) fumarate, 2,6-diisocyanate methyl caproate, 2,2,4(2,4,4)-trimethylhexamethylene diisocyanate, and dimer acid diisocyanates; (2) cycloaliphatic diisocyanates such as 1,3 cyclopentane diisocyanate, 1,4 cyclopentane diisocyanate, 1,2 cyclopentane diisocyanate, and methylcyclohexylene diisocyanate; (3) aromatic diisocyanates such as m-phenylene diisocyanate, p-phenylenediisocyanate, 4,4'diphenyl diisocyanate, 1,5 methylene diisocyanate, 1,4 napthalene diisocyanate; (4) aliphatic/aromatic diisocyanates such as 4,4'diphenylene methane diisocyanates, 2,4 or 2,6 tolulene diisocyanate, 4,4'toluidene diisocyanate, 1,4 xylylene diisocyanate; (5) nuclear substituted aromatic compounds such as dianisidine diisocyanate, 4,4'diphenylether diisocyanate, chlorodiphenylene diisocyanate; (6) triisocyanates such as triphenylmethane 4,4', 4,4"triisocyanate, 1,3, 5 triisocyanate benzene, 2,4, 6 triisocyanate toluene; (7) tetraisocyanates such as 4,4'diphenyl dimethylmethane 2,2',5,5'tetraisocyanate; (8) polymerized isocyanates such as tolylene diisocyanate dimers and trimers and the like; and (9) polyisocyanates such as prepolymers derived from a polyol, including polyether polyols or polyester polyols (including polyethers which are reacted with excess polyisocyanates to form isocyanate terminated prepolymers), simple polyols such as glycols (e.g., ethylene glycol, propylene glycol), other polyols such as glycerol, trimethylol propane, hexane triol, pentaerythritol and the like, as well as monoethers, e.g., diethylene glycol, tripropylene glycol and the like and polyethers, i.e., alkylene oxide condensates of the above. While the polyisocyanate may be any organic polyisocyanate, such crosslinking agents for coating composition to be employed as topcoats are preferably aliphatic or cycloaliphatic polyisocyantes due to their superior weathering properties.

Especialy preferred for use in the clearcoat compositions of the invention are trimerized products of aliphatic diisocyanates such as 1,6 hexamethylene diisocyanate. Still another particularly preferred type of a polyisocyanate crosslinking agent for the clearcoat is a polyisocyanate having a biuret structure. This type of polyisocyanate is well known as are methods for making the same. One such polyisocyanate crosslinking agent is a high molecular weight biuret of 1,6 hexamethylene diisocyanate sold by Mobay Chemical Company under the tradename Desmodur N. Exemplary of other biuret type polyisocyanates are those prepared in accordance with U.S. Pat. No. 3,976,622 to Wagner et al.

The crosslinking agent of the basecoat coating composition of this invention is an amine-aldehyde crosslinking agent. Amine-aldehyde crosslinking agents suitable for crosslinking hydroxy functional bearing materials are well known in the art. Typically, these crosslinking materials are product of reactions of melamine, or urea with formaldehyde and various alcohols containing up to and including 4 carbon atoms. Preferably, the amine-aldehye crosslinking agents useful in this invention are amine-aldehyde resins such as condensation products of formaldehyde with melamine, substituted melamine, urea, benzoguanamine or substituted benzoguanamine. Preferred members of this class are methylated melamine-formaldehyde resins such as hexamethoxymethylmelamine. The particular preferred crosslinkers are the high solids melamine resins which has substantially 100 percent nonvolatile content as measured by the foil method at 45° C. for 45 minutes. For the purposes of the preferred composition of this invention it should be recognized that it is important not to introduce extraneous diluents that lower the final solids content of the coating. Other suitable amine-aldehyde crosslinking agents will be apparent to one skilled in the art. The amine-aldehyde materials function as a crosslinking agent in the basecoat compositions of the invention by reacting with the hydroxy functionality of the hydroxy-containing urethane modified polyester (A) of the basecoat composition and by reaction with the hydroxy funtionality on the linear polyurethane (C), if such materials are included in the basecoat compositions. The amine aldehyde crosslinking agent is generally included in the basecoat composition in an amount of between about 5 and about 60, more preferably, between about 20 and about 40 weight percent based on the weight of the hydroxy-containing urethane modified polyester. Selection of the particular amount of amine-aldehyde crosslinking agent to be employed in the basecoat composition is dependent on the desired properties of the coating compositions as well as its intended use as would be apparent to one skilled in the art.

Particular preferred crosslinking agents are the amino crosslinking agents sold by American Cyanamid under the trademark "Cymel". In particular, Cymel 301, 303, 325, 1130, 1156, which are alkalated melamine aldehyde resins are useful in the compositions of this invention.

The crosslinking reactions are catalytically accelerated by acids. One such catalyst for example which may be so employed is p-toluene sulfonic acid which, when employed, is generally added to the composition in about 0.5% by weight based on the total weight of the amine-aldehyde crosslinker and hydroxy-containing modified polyester of the basecoat composition.

The amounts of crosslinking agent to be employed in the basecoat composition and in the clearcoat composition are selected individually, i.e., the weight percent amounts of crosslinker employed in the basecoat composition and in the clearcoat composition of a particular basecoat/clearcoat system may be different or be similar.

The basecoat coating composition of the invention also include pigments, as noted above. A wide variety of pigments are available and known for use in coating compositions by those skilled in the art. Selection of the optimal amount of pigment to be included in the basecoat composition would be dependent on, e.g., desired color, hiding requirements of the coating, etc., and would be within the skill of those in the art.

Optional Materials

Additional materials which may be employed in the coating compositions of this invention include a high molecular weight linear polyurethane which has a number average molecular weight of between about 15,000 and about 40,000, preferably between about 20,000 and about 30,000. It may be made by reacting one of the above mentioned diisocyanates and diols, such as oligoester diol, polycaprolactone diol, polyoxypropylene diol, polyether diols, etc. Suitable high molecular weight linear polyurethane materials are commercially available, for example, as Spenlite L06-30S, (available from and a trademark of Spencer-Kellogg, Buffalo, N.Y.). The high molecular weight polyurethane may be employed in the composition in amounts up to about 60 weight percent based on the total weight of the hydroxy-containing urethane modified polyester and crosslinking agent. When employed, it is preferred that they be included in the composition in amounts of between about 10%–60%, more preferably 30%–50% by weight as described. It has been found that by incorporating this polyurethane in the basecoat of basecoat/clearcoat systems, the depth of color and metallic glamour of the basecoat/clearcoat system is improved. While this linear polyurethane, when employed, is generally preferably only included in the basecoat composition, it may be employed in either or both coats and the amounts are independently selected.

In addition to the above discussed components, other materials may be included in the coating compositions of this invention. These include materials such as catalysts, antioxidants, U.V. absorbers, solvents, surface modifiers and whitening agents. Solvents used in the coating composition of this invention are those which are commonly used, e.g., to facilitate spray application and high solids content and include toluene, xylene, methylethyl ketone, acetone, 2-ethoxy-1-ethanol, diacetone alcohol, tetrahydrofuran, ethyl acetate, dimethylsuccinate, dimethylglutarate, dimethyladipate or mixtures thereof. The solvent in which the hydroxy-containing urethane modified polyester is prepared may be employed as a solvent for the composition thus eliminating the need for drying the resin after preparation, if such is desired.

Typical of the ultraviolet stabilizers that are useful in this invention are benzophenones such as dodecyl oxibenzophenone, 2,4-dihydroxybenzophenone,hydroxybenzophenones containing sulfonic groups, 2,4-dihydroxy-3',5'-ditertiarybutylbenzophenone, 2,2',4'-trihydroxybenzophenone esters of dicarboxylic acids, 2-hydroxy-4-acryloxyethoxybenzophenone, aliphatic monoesters of 2,2',4-trihydroxy-4'-alkoxybenzophenone; 2-hydroxy-4-methoxy-2-carboxybenzophenone; triazoles such as 2-phenyl-4-(2',4'-dihydroxybenzoyl)-triazoles substituted benzotriazoles such as hydroxyphenyltriazoles such as 2-(2'-hydroxy-5'-methylphenyl)benzotriazole, 2-(2'-hydroxyphenyl)benzotriazole, 2-(2'-hydroxy-5'-octylphenyl)naphthiotriazole. Another type of ultralight stabilizer and one that is particularly preferred for use in the coatings of this invention comprise those taught in concurrently filed U.S. application Ser. No. 553,321, now U.S. Pat. No. 4,480,084 entitled "Polymeric Light Stabilizers" to Kordomenos et al. These stabilizers contain the sterically hindered polyalkylpiperidine radical and at least two primary hydroxyl groups available for reacting with the crosslinking agent, e.g., amine-aldehyde or polyisocyanate, of the coating composition.

Typical of the antioxidants which may be employed in the coating composition include tetrakis alkylene (di-alkyl hydroxy aryl) alkyl ester alkanes such as tetrakis methylene 3-(3',5'-dibutyl-4'-hydroxyphenyl) proprionate methane, reaction product of p-amino diphenylamine and glycidyl methacrylate, reaction product of n-hexyl-N'-phenyl-p-phenylene diamine and glycidyl methacrylate, pentaerythritol tetrakis (thioglycolate), trimethylol propane tris (thioglycolate), trimethylol ethane tris(thioglycoate), N-(4-anilinophenyl)-acrylamide, N-(4-anilinophenyl) maleamic acid, N-(4-anilinophenyl) maleimide, alkylhydroxyphenyl groups bonded through carboalkoxy linkages to nitrogen atom of a heterocyclic nucleus containing an imidodicarbonyl group or an inidodithiocarbonyl group, 3,3-ditertbutyl-4-hydroxy cinnamonitrile, ethyl 3,5-diterthexyl-4-hydroxy cinnamate, substituted benzyl esters of beta-substituted (hydroxyphenyl) propionic acids, bis-(hydroxyphenyl alkylene) alkyl isocyanurate compounds, tetrakis hydroxy benzyl phosphonium halides alone or in combination with a dialkylthiodialkanoate, thiodimethylidyne tetrakisphenols alone or in combination with a dialkyl thiodialkanoate or phosphite or phosphonate, dihydrocarbyl-hydroxyphenyl aryl or alkyl phosphonites or phosphonates or phosphates or phosphites or phosphinates or phosphinites or phosphorothionates or phosphinothionates, diphenyl bis(3,5-ditertbutyl-4-hydroxyphenoxy) silane, hydrocarbylhydroxyphenyl-dihydrocarblydithio-carbamates such as 3,5 ditertbutyl-4-hydroxyphenyl dimethyldithio carbamate and amino benzyl thioether.

In one preferred embodiment of basecoat/clearcoat compositions, the basecoat would preferably contain a benzotriazole U.V. stabilizer such as Tinuvin 328 (a trademark of and commercially available from Ciba-Geigy, Ardsley, N.Y.), and the clearcoat would contain a benzotriazole U.V. stabilizer, e.g., Tinuvin 328, the polymeric hindered amine light stabilizer of the aforementioned concurrently filed application to Kordomenos et al, and an antioxidant, e.g., Irganox-1010. (available from and a trademark of Ciba-Geigy). While preferred combinations of stabilizer and antioxidant have been described, these teachings are not meant to be limiting. Selection of the optimal type of stabilizer and antioxidant which may be employed would be within the skill of one in the art.

Surface modifiers or wetting agents are common additives for liquid paint compositions. Exact mode of operation of these surface modifiers is not known but it is thought that their presence contributes to better adhesion of coating compositions to the surface being coated and helps formation of thin coatings, particularly on metal surfaces. The choice of surface modifiers or wetting agents is dependent upon the type of surface to be coated. Selection of appropriate surface modifiers will be well within the skill of the artesian. Typical of these surface modifiers are polybutyl acrylate and a wide variety of silicon wetting agents which are commercially available.

For many applications of the coating compositions of the invention, particularly high solids compositions, it may be desirable to employ flow control additives to provide sag free coatings. Among numerous such materials are NAD's such as described by Porter (S. Porter, Jr., and B. N. McBane, U.S. Pat. No. 4,025,474, May 24, 1977). These particle dispersions may be included generally in amount up to 15% by weight of the total composition. Other types of NAD's such as described by D. L. Maker and S. C. Peng (U.S. Pat. No. 3,814,721, June 4, 1974) or by S.K. Horvath (U.S. application Ser. No. 292,853, filed Aug. 14, 1981) also may be included in the coating compositions.

The coating composition can be applied by conventional methods known to those in the art. These methods include roll coating, spray coating, dipping or brushing and of course the particular application technique chosen with the particular substrate to be coating and the environment in which coating operation takes place.

Particular preferred techniques for applying these coating compositions, particularly when applying the same to automobiles, is spray coating through the nozzle of the spray gun. The basecoat can be applied as a single component by means of a single component spray gun. On the other hand, in spray applying the clearcoat composition, the hydroxyl-containing urethane modified polyester and the optional linear polyurethane along with other additives such as pigments, U.V. adsorbers, antioxidants and other nonreactive materials are admixed with a solvent. These materials are fed as one component of a two component system into a spray gun which combines the materials as they are sprayed onto the automotive substrate. The other material is the polyisocyanate crosslinking agent, which may or may not be cut with a suitable nonreactive solvent.

Industrial Applicability

It will be apparent from the foregoing that this invention has industrial applicability to automotive application and provides a flexible durable coating for metal and plastic substrates.

The invention will be further understood by referring to the following detailed examples. It should be understood that the specific examples are presented by way of illustration and not by way of limitation. Unless otherwise specified, all references to "parts" is intended to mean parts by weight.

Example I

In a suitable reactor 562 gms of Esterdiol-204 (trademark of Union Carbide), 360 gms of xylene were charged. The mixture was brought to reflux (149° C.) and any water present was stripped out. The temperature was lowered to 93° C. and 360 gms of Desmodur W (diisocyanate, trademark of Mobay Chemical Co.) was added dropwise in a period of one hour. After the end of the addition, the mixture was postreacted at 93° C. until no NCO group was observed in an infrared spectrum. At this point, 240 gms of PCP-0301 (polycaprolactone triol, trademark of Union Carbide, New York, N.Y.) 263 gms of adipic acid, 3 gms of dibutyl tin oxide, and 215 gms of xylene were added. The mixture was heated up to 204° C. and water was distilled off until the acid number dropped below 10. The batch was then thinned with 480 parts of methyl amyl ketone. The final product had $Z_3$ viscosity at 70.8% NV and acid number 1.2.

EXAMPLE II

In a suitable reactor 562 gms of Esterdiol-204 (trademark of Union Carbide) and 360 gms of xylene were charged. The mixture was brought to reflux (149° C.) and any water present was stripped out. The temperature was lowered to 93° C. and 360 gms of isophorone diisocyanate was added dropwise in a period of one hour. After the end of the addition, the mixture was postreacted at 93° C. until no NCO group was observed in an IR spectrum. At this point, 240 gms of PCP-0301 (polycaprolactone triol, trademark of Union Carbide, New York, N.Y.) 263 gms of adipic acid, 3 gms of dibutyl tin oxide, and 215 gms of xylene were added. The mixture was heated up to 204° C. and water was distilled off until the acid number dropped below 10. The batch was then thinned with 480 parts of methyl amyl ketone. The final product had Y viscosity at 72% NV and acid number 7.9.

EXAMPLE III

In a suitable reactor 286 gms of neopentyl glycol and 360 gms of xylene were charged. The temperature was roused to 93° C. and 360 gms of Desmodur W (trademark of Mobay Chemical Co.) was added dropwise in a period of one hour. After the end of the addition, the mixture was postreacted at 93° C. until no NCO group was observed in an IR spectrum. At this point, 240 gms of PCP-0301 (polycaprolactone triol, trademark, of Union Carbide) 263 gms of adipic acid, 3 gms of dibutyl tin oxide, and 215 gms of xylene were added. The mixture was heated up to 204° C. and water and xylene was distilled off until the acid number dropped below 10. The batch was then thinned with 480 parts of methyl amyl ketone. The final product had $Z_4$ viscosity at 71.7% and acid number 0.8. number.

EXAMPLE IV

In a suitable reactor 281 gms of Esterdiol-204, 728 gms of PCP-0200, (polycaprolactone diol, trademark, Union Carbide) and 360 gms of xylene were charged. The mixture was brought to reflux (149° C.) and any water present was stripped out. The temperature was lowered at 93° C. and 360 gms of Desmodur W (trademark of Mobay Chemical Co.) was added dropwise in a period of one hour. After the end of the addition, the mixture was postreacted at 93° C. until no NCO group was observed in an IR spectrum. At this point, 108 gms of trimethylol propane, 263 gms of adipic acid, 3 gms of dibutyl tin oxide, and 200 gms of xylene were added. The mixture was heated up to 204° C. and water and xylene was distilled off until the acid number dropped below 10. The batch was then thinned with 400 parts of methyl amyl ketone. The final product had $Z_1$ viscosity at 72.7% NV and acid number 2.0.

EXAMPLE V

In a suitable reactor 562 gms of Esterdiol-204 (trademark of Union Carbide) and 360 gms of xylene were charged. The mixture was brought to reflux (149° C.) and any water present was stripped out. The temperature was lowered to 93° C. and 360 gms of Desmodur W (trademark of Mobay Chemical Co.) was added dropwise in a period of one hour. After the end of the addition, the mixture was postreacted at 93° C. until no NCO group was observed in an IR spectrum. At this point, 108 gms of trimethylol propane and 108 gms of dimer acid (Empol 1016, Emery, Ind.) 3 gms of dibutyl tin oxide, and 200 gms of xylene were added. The mixture was heated up to 204° C. and water and xylene was distilled off until the acid number dropped below 10. The batch was then thinned with 400 parts of methyl amyl ketone. The final product had X+ viscosity at 69.2% NV and acid number 2.9.

EXAMPLE VI

In a suitable reactor 753 gms of Esterdiol-204 (trademark of Union Carbide) and 360 gms of xylene were charged. The mixture was brought to reflux (149° C.) and any water present were stripped out. The temperature was lowered to 93° C. and 360 gms of Desmodur W (trademark of Mobay Chemical Co.) was added dropwise in a period of one hour. After the end of the addition, the mixture was postreacted at 93° C. until no NCO group was observed in an IR spectrum. At this point, 474 gms of PCP-0301 (polycaprolactone triol, trademark of Union Carbide) 263 gms of adipic acid, 402 gms of dodecanoic acid, 4 gms of dibutyl tin oxide, and 200 gms of xylene were added. The mixture was heated up to 204° C. and water and xylene was distilled off until the acid number dropped below 10. The batch was thinned with 480 parts of methyl amyl ketone. The final product of $Z_1+$ viscosity at 70.0% NV and acid number 5.2.

EXAMPLE VII

In a suitable reactor 136 gms of propylene glycol, 172 gms of adipic acid and 66.4 gms of toluene were added. The mixture was heated up to reflux and 42.6 gms of water were stripped. At this point, 321 gms of oligoester (made according to Example I of U.S. Pat. No. 4,322,508 to Peng et al), 250 gms of toluene, 10 gms of dibutyl tin dilaurate were added. In a period of 3 hours, 396 parts of Desmodur W (trademark, Mobay Chemical Co.) were added. During the addition, the temperature was let to rise from 116° C. to 143° C. The mixture was kept at this temperature until no NCO pick was observed in an IR spectrum. The batch was thinned with 860 gms of toluene and 1,260 gms isopropanol. The final product had a W viscosity at 33.1% NV.

EXAMPLE VIII

IN a suitable reactor 562 gms of Esterdiol-204 (trademark of Union Carbide) and 360 gms of xylene were charged. The mixture was brought to reflux (149° C.) and any water present was stripped out. The temperature was lowered to 93° C. and 360 gms of Desmodur W (trademark of Mobay Chemical Co.) was added dropwise in a period of one hour. After the end of the addition, the mixture was postreacted at 93° C. until no NCO group was observed in an IR spectrum. At this point, 240 gms of PCP-0301 (polycaprolactone triol, trademark of Union Carbide, New York, N.Y.) 131 gms of adipic acid and 133 gms of phthalic anhydride, 3 gms of dibutyl tin oxide, and 215 gms of xylene were added. The mixture was heated up to 204° C. and water was distilled off until the acid number dropped below 10. The batch was then thinned with 480 parts of methyl amyl ketone. The final product had $Z_5$ viscosity at 70.1% NV and acid number 3.

EXAMPLES IX-XII

Flexible basecoat compositions were formulated according to the following table:

| Compositions/Example | IX | X | XI | XII |
|---|---|---|---|---|
| Resin of Example I | 50 | | | |
| Resin of Example II | | 93 | | |
| Resin of Example III | | | 50 | |
| Resin of Example VII | | | 100 | |
| Resin of Example IV | | | | 57 |
| Spenlite L06-30S[1] | 100 | | | 50 |
| Cymel 1130[2] | 46 | 46 | 46 | 46 |
| Tinuvin-328[3] | 3.6 | 3.6 | 3.6 | 3.6 |
| PTSA (40%) | 1.5 | 1.5 | 1.5 | 1.5 |
| 5000-AR[4] | 50 | 50 | 50 | 49 |
| Xylene | 75 | 75 | 75 | |
| Isopropyl alcohol | 75 | 75 | 75 | 75 |
| Surfynol-104[5] | 6 | 6 | 6 | 21 |
| Methyl amyl ketone | | | | 100 |

[1]Trademark, Spencer-Kellogg, Buffalo, N.Y.
[2]Trademark, American Cyanamid Co., Wayne, N.J.
[3]Trademark, Ciba-Geigy
[4]Aluminum Paste, purchased Silberling, Lansford, Pa.
[5]Trademark, Air Products and Chemicals, Inc., Allentown, Pa. (Surfactant: 2,4,7,9-tetramethyl-5-decyn-4,7-diol)

The above basecoats were produced to 20 sec. at #4 Ford Cup with methyl amyl ketone before spraying.

| | Clearcoat Compositions | | | | | | |
|---|---|---|---|---|---|---|---|
| | Examples | | | | | | |
| Composition | XIII | XIV | XV | XVI | XVII | XVIII | XIX |
| Resin of Example I | 414 | | | | | | |
| Resin of Example II | | 401 | | | | | |
| Resin of Example III | | | 403 | | | | |
| Resin of Example IV | | | | 397 | | | |
| Resin of Example V | | | | | 417 | | |
| Resin of Example VI | | | | | | 414 | |
| Resin of Example VIII | | | | | | | 414 |
| Desmodur L-2291A[1] | 123 | | 123 | 123 | 123 | 123 | 123 |
| Desmodur Z-4370[2] | 175 | 175 | | | | | 175 |
| Tinuvin 328[3] | 6.2 | 6.2 | 6.2 | 6.2 | 6.2 | 6.2 | 6.2 |
| Polymeric light stabilizer[4] | 8.8 | 8.8 | 8.8 | 8.8 | 8.8 | 8.8 | 8.8 |
| Irganox 1010[5] | 0.8 | 0.8 | 0.8 | 0.8 | 0.8 | 0.8 | 0.8 |
| Methyl amyl ketone | 100 | 100 | 100 | 100 | 100 | 100 | 100 |

The above compositions were reduced to 30 sec. viscosity at #4 Ford Cup with methyl amyl ketone.
[1,2]Trademark, Mobay Chemical Co., Pittsburgh, Pa. polyisocyanate
[3]Trademark, Ciba-Geigy
[4]Hindered amine stabilizer made according to Example I of U.S. Application Ser. No. 553,321, now U.S. Pat. No. 4,480,084 to Kordomenos et al.
[5]Trademark, Ciba-Geigy (Antioxidant)

| Coating Composition | Example | | | | | | | | | |
|---|---|---|---|---|---|---|---|---|---|---|
| | XX | XXI | XXII | XXIII | XXIV | XXV | XXVI | XXVII | XXVIII | XXIX |
| Basecoat of Example | IX | X | XI | XII | IX | IX | IX | IX | IX | IX |
| Clearcoat of Example | XIII | XIV | XIII | XIII | XIV | XV | XVI | XVII | XVIII | XIX |
| % Elongation | 150 | 155 | 120 | 140 | 200 | 160 | 140 | 130 | 135 | 50 |
| MEK resistance (100 rubs) | Excell | Excell | Excell | Excell | Excell | Excell | Good | Excell | Excell | Excell |
| QUV (1000 hrs.) | Excell | Excell | Excell | Excell | Excell | Excell | Good | Excell | Excell | Excell |

We claim:

1. A flexible basecoat/clearcoat coating composition, useful as automotive finish coats on metal and plastic substrates, which is characterized in that the basecoat composition and the clearcoat composition each independently comprises:
   (A) hydroxy-containing urethane modified polyester
      (i) having a number average molecular weight ($M_n$) of between about 1000 and about 10,000, (ii) having a hydroxyl number of between about 30 and about 200, and (iii) containing between about 1 and about 10 urethane groups per molecule, and being made from reactants comprising:
      (1) urethane modified diol made by reacting: (a) diol, and (b) diisocyanate, wherein said diol and said diisocyanate are reacted in a molar ratio of from about 4:1 to about 4:3;
      (2) polyol comprising at least about 5 weight percent triol; and
      (3) acid component selected from dicarboxylic acids and anhydrides thereof; and
   (B) crosslinking agent; and
   (C) 0-60 weight percent, based on the total weight of (A) and (B) of the composition, of a linear polyurethane having a number average molecular weight of between about 15,000 and about 40,000, and wherein said crosslinking agent of said clearcoat composition is a polyisocyanate crosslinking agent and said crosslinking agent of said basecoat composition is an amine-aldehyde crosslinking agent, and wherein said basecoat composition additionally comprises pigment.

2. A flexible basecoat/clearcoat coating composition according to claim 1, wherein said hydroxy-containing urethane modified polyester of said clearcoat composition has a number average molecular weight of between about 2000 and about 4000.

3. A flexible basecoat/clearcoat coating composition according to claim 1, wherein said hydroxy-containing urethane modified polyester of said clearcoat composition has a hydroxyl number of between about 50 and about 120.

4. A flexible basecoat/clearcoat coating composition according to claim 1, wherein in forming said urethane modified diol of said clearcoat composition said diol and said diisocyanate are reacted in a molar ratio of from about 2:0.8 to about 2:1.2.

5. A flexible basecoat/clearcoat coating composition according to claim 1, wherein said polyol of said clearcoat composition further comprises diol.

6. A coating composition according to claim 5, wherein said polyol of said clearcoat comprises about 10-80 weight percent triol and about 90-20 weight percent diol.

7. A flexible basecoat/clearcoat coating composition according to claim 1, wherein said dicarboxylic acids of said clearcoat composition comprise $C_6$-$C_{12}$ aliphatic dicarboxylic acid.

8. A flexible basecoat/clearcoat coating composition according to claim 1, wherein said polyisocyanate crosslinking agent is included in said clearcoat composition in an amount of between about 5 and about 60 weight percent based on the weight of the hydroxy-containing urethane modified polyesters of the clearcoat composition.

9. A coating composition according to claim 1, wherein said polyisocyanate crosslinking agent of said clearcoat composition is a diisocyanate.

10. A coating composition according to claim 1, wherein said polyisocyanate crosslinking agent of said clearcoat composition has 3 or more reactive isocyanates per molecule.

11. A coating composition according to claim 10, wherein said polyisocyanate crosslinking agent is a trimerized product of an aliphatic diisocyanate.

12. A coating composition according to claim 11, wherein said polyisocyanate crosslinking agent is a trimerized reaction product of 1,6 hexamethylene diisocyanate.

13. A coating composition according to claim 10, wherein said polyisocyanate crosslinking agent is a polyisocyanate having a biuret structure.

14. A flexible basecoat/clearcoat composition according to claim 1, wherein said hydroxy-containing urethane modified polyester of said basecoat composition has a number average molecular weight ($M_n$) of between about 2000 and about 4000.

15. A flexible basecoat/clearcoat coating composition according to claim 1, wherein in forming said urethane modified diol of said basecoat composition said diol and said diisocyanate are reacted in a molar ratio of from about 2:0.8 to about 2:1.2.

16. A flexible basecoat/clearcoat coating composition according to claim 1, wherein said polyol of said basecoat composition further comprises diol.

17. A flexible basecoat/clearcoat coating composition according to claim 16, wherein said polyol of said basecoat composition comprises about 10-80 weight percent triol and about 90-20 weight percent diol.

18. A flexible basecoat/clearcoat coating composition according to claim 1, wherein said dicarboxylic acids of said basecoat composition comprise $C_6$-$C_{12}$ aliphatic dicarboxylic acids.

19. A flexible basecoat/clearcoat coating composition according to claim 1, wherein said amine-aldehyde crosslinking agent of said basecoat composition is employed in an amount of from about 5 to about 60 weight percent based on the weight of said hydroxy-containing modified polyester present in said basecoat composition.

20. A flexible basecoat/clearcoat composition according to claim 1, wherein said hydroxy-containing urethane modified polyester of said basecoat composition has a number average molecular weight ($\overline{M}_n$) of between about 2000 and about 4000.

* * * * *